United States Patent
Kim

(10) Patent No.: US 7,513,652 B2
(45) Date of Patent: Apr. 7, 2009

(54) BACKLIGHT UNIT AND LIQUID CRYSTAL DISPLAY DEVICE USING THE SAME

(75) Inventor: Gi Bin Kim, Gyeonggi-do (KR)

(73) Assignee: LG. Display Co., Ltd., Seoul (KR)

( * ) Notice: Subject to any disclaimer, the term of this patent is extended or adjusted under 35 U.S.C. 154(b) by 147 days.

(21) Appl. No.: 11/639,506

(22) Filed: Dec. 15, 2006

(65) Prior Publication Data

US 2007/0230173 A1 Oct. 4, 2007

(30) Foreign Application Priority Data

Mar. 31, 2006 (KR) .................. 10-2006-0029537

(51) Int. Cl.
*F21V 29/00* (2006.01)
(52) U.S. Cl. ...................... 362/294; 362/373
(58) Field of Classification Search ........... 362/294, 362/373, 249, 800, 235
See application file for complete search history.

(56) References Cited

U.S. PATENT DOCUMENTS

| | | | | |
|---|---|---|---|---|
| 3,613,150 | A | * | 10/1971 | Whitman et al. .............. 16/244 |
| 6,789,921 | B1 | * | 9/2004 | Deloy et al. ................. 362/252 |
| 6,917,143 | B2 | * | 7/2005 | Matsui et al. ................. 313/35 |
| 2006/0092666 | A1 | * | 5/2006 | Jeong et al. ................. 362/613 |

* cited by examiner

*Primary Examiner*—Thomas M Sember
(74) *Attorney, Agent, or Firm*—Brinks Hofer Gilson & Lione

(57) ABSTRACT

A backlight unit with a graphite spreader and coating films for sealing the graphite spreader to prevent fall of foreign substances from the graphite spreader is provided with a liquid crystal display device. The backlight unit includes a cover bottom, a plurality of light sources mounted on the cover bottom, a graphite spreader that dissipates heat from the light sources and is formed with at least one hole, and first and second coating films that are attached to upper and lower surfaces of the graphite spreader, respectively, and extend outward from an edge of the graphite spreader such that extent that the first and second coating films contact each other.

10 Claims, 10 Drawing Sheets

BACKLIGHT UNIT AND LIQUID CRYSTAL DISPLAY DEVICE USING THE SAME

This application claims the benefit of Korean Patent Application No. P06-29537, filed on Mar. 31, 2006, which is hereby incorporated by reference as if fully set forth herein.

TECHNICAL BACKGROUND

Discussion of the Related Art

Cathode ray tubes (CRT) are generally used for TVs, monitors of metering devices, and data terminal equipment. However, CRTs often do not satisfy the size and weight requirements of electronic appliances because the CRTs include a relatively bulky and heavy structure.

Various display devices have recently been developed which can be used in place of a CRT. Such display devices include liquid crystal displays (LCD) using an electro-optical effect, plasma display panels (PDP) using gas discharge, and electro-luminescent displays (ELD) using an EL effect.

LCDs are often compact, light weight, and consume relatively low amounts of power and have actively been developed to be substituted for CRTs in many applications. Recently, the LCD technology has been advanced to enable LCDs to sufficiently function as flat panel display devices. Accordingly, LCDs are used not only for monitors of laptop computers, but also for monitors of desktop computers and large-size information display devices.

LCDs require a separate light source, often a backlight unit, to illuminate the LCD panel because such an LCD is a light reception type display device that uses light externally received to display an image. Backlight units are generally either edge type units or direct type units depending on the arrangement of a cylindrical fluorescent lamp or lamps within the LCD unit.

In an edge type backlight unit, a lamp unit is arranged at one side of a light guide plate. The lamp unit includes a lamp that emits light and lamp holders that are fitted around opposite ends of the lamp for holding the lamp. A lamp-side reflection plate which is fitted on side of the light guide plate such that the reflection plate surrounds an outer peripheral surface of the lamp. The reflection plate reflects the light emitted from the lamp toward the light guide plate.

Edge type backlight units are mainly applied to small sized LCDs such as a monitor of a laptop computer or desktop computer. The edge type backlight unit exhibits excellent light uniformity and long lifespan, and is advantageous due to the slimness of the LDC with the edge type backlight unit.

Direct type backlight units have been actively developed for use with 20 inch or greater LDC panels. In direct type backlight units, a plurality of lamps are aligned beneath a diffusion plate such that the lamps directly irradiate light to a front surface of an LCD panel. Direct type backlight units are often used large LCD devices that require significant brightness because direct type backlight units have a greater light use efficiency than edge type backlight units.

When direct type backlight units are used with large LCD devices, the operating time of the backlight unit and the number of lamps used in the backlight unit is increased over that used with smaller LDC devices, which causes an increased possibility of lamp failure and lower lamp lifespan.

In the edge type backlight units where the lamp units are arranged at both sides of the light guide plate, and when one lamp from the unit fails, the overall brightness on the screen is decreased, but other problems does not arise. However, with direct type backlight units, because a plurality of lamps are mounted below the screen, when one lamp fails, the portion on the LDC screen where the lamp fails becomes considerably dark in comparison with the other portions. As a result, the dark portion appears immediately on the screen. Because the lamps must be replaced frequently in the direct type LCD device, an LCD device should be structured such that the lamp units can be easily assembled and disassembled.

Hereinafter, a conventional backlight unit will be described with reference to the annexed drawings.

As shown in FIG. 1, the conventional direct type backlight unit includes a plurality of lamps 1, a case 3 which fixes and supports the lamps 1, and light scattering means 5a, 5b and 5c which are disposed between the lamps 1 and an LCD panel (not shown).

The light scattering means 5a, 5b and 5c are provided for preventing the shape of the lamps from being visible on a display surface of the LCD panel and for providing a generally uniform brightness distribution on the LDC panel. A plurality of diffusion sheets and diffusion plates are additionally provided in order to increase a light scattering effect. A reflection plate 7 is disposed in the case 3 so that light emitted from the lamps 1 is concentratedly irradiated to the display part of the LCD panel to maximize light use efficiency of the device.

The lamp 1 may be a cold cathode fluorescent lamp (CCFL), in which electrodes are provided in both ends of a tube. Light is emitted from the lamp 1 if power is applied to the electrodes. Both ends of the lamp 1 are fitted in recesses (not shown) formed at both sides of the case 3.

Power lines 9a and 9b for providing power to the lamp 1 are connected to the electrodes at the both ends of the lamp 1, and are connected to a driving circuit through additional connectors.

The power line 9a connected to one electrode of the lamp 1 is connected to one connector, and the power line 9b connected to the other electrode of the lamp 1 is connected to another connector. Either the power line 9a or the power line 9b may be bent downward from the case 3 and connected to an external connector.

Accordingly, the connecting structure is complicated and voltage transfer to the lamp 1 is not efficiently achieved because every lamp 1 needs the additional connector and any one of the power lines is significantly extended to be connected to the connector. The case 3 is disposed beneath the lamps 1 and configured to protect the lamps 1, the case 3 is also called a "cover bottom".

In direct type backlight units, the plurality of lamps are aligned beneath the diffusion plate such that the lamps directly irradiate light toward a front surface of the LCD panel.

Both edge type backlight units and direct type backlight units often use fluorescent lamps for their light source. In consideration of environmental pollution by harmful gases used in fluorescent lamps, research of new light sources is being pursued. For example, a light emitting diode (LED) is being pursued for LCD appliances because the LEDs emit or produce relatively no environmental pollution, are available in various colors, and low power consume low amounts of power during operation.

As shown in FIG. 2, a conventional direct type backlight unit using LEDs includes a cover bottom 20, a plurality of metallic printed circuit boards (PCBs) 75 that are arranged in rows on the cover bottom 20 in parallel with each other, a plurality of red LEDs 70a, green LEDs 70b and blue LEDs 70c that are arranged on the PCBs 75 with a gap therebetween, and a plurality of optical sheets ("50" in FIG. 3) which are disposed above the red, green and blue LEDs 70a, 70b and 70c.

A reflection plate 25 is formed around the red, green and blue LEDs 70a, 70b and 70c, and reflects light emitted from the red, green and blue LEDs 70a, 70b and 70c upward, thereby increasing optical efficiency. The LEDs 70a, 70b and 70c are aligned beneath an LCD panel (as shown in element 40 in FIG. 3).

As shown in FIG. 3, the conventional LCD device equipped with the backlight unit including the LEDs includes a cover bottom 20, a plurality of metallic printed circuit boards (PCBs) 75 that are arranged in rows on the cover bottom 20 in parallel with each other. The device also includes a plurality of red, green and blue LEDs 70a, 70b and 70c (commonly, "70") that are arranged on the PCBs 75 with a gap therebetween, and a reflection plate 25 that is formed around the red, green and blue LEDs 70a, 70b and 70c. A plurality of optical sheets 50 are disposed above the LEDs 70, an LCD panel 40 is disposed above the optical sheets 50, and a guide panel 60 supports the LCD panel 40 and the optical sheets 50. A case top 30 is formed near an upper edge portion of the LCD panel 40 and side surfaces of the guide panel 60 and the cover bottom 20. The metallic PCBs 75 are spaced apart from each other with a regular gap therebetween, to aid in the dissipation of heat from the LEDs 70.

The LCD panel 40 further includes upper and lower substrates that are spaced apart from each other, a liquid crystal layer (not shown) that is interposed between the upper and lower substrates, and upper and lower polarizing plates that are formed at surfaces of the upper and lower substrates. The optical sheets 50 include first and second prism sheets and diffusers.

In the above-structured backlight unit including the LEDs, an image is displayed on the LCD panel 40 by lighting the LEDs 70. If power is applied to all of the LEDs 70 or selectively applied to the red LEDs 70a, the green LEDs 70b or the blue LEDs 70c, the corresponding LEDs 70 emit light. The red, green and blue light emitted from the LEDs 70 is mixed by the space between the LEDs 70 and the optical sheets 50 and by the optical sheets 50 themselves, and the mixed light is irradiated to a rear surface of the LCD panel 40.

The conventional backlight unit including the LEDs is structured such that the LEDs 70 are mounted to the metallic PCBs 75, which are mounted to the metallic cover bottom 20. Because LEDs have a lower optical efficiency than a cold cathode fluorescent lamp (CCFL), relatively much power is consumed to increase the brightness on the front surface of the LCD panel, and more heat is generated.

As seen from the aforesaid structure, most of the heat from the LEDs 70 is transferred to the cover bottom 20 via the metallic PCBs 75, and dissipated outside from the cover bottom 20. The metallic PCBs 75 are made from aluminum (Al), and the cover bottom 20 is made from an aluminum alloy or micro polyethylene ether-phthalein (MCPET). In this case, a thermal conduction coefficient of aluminum or aluminum alloy is 100 W/mk or less, and a thermal conduction coefficient of MCPET is very, on the order of 0.2 W/mk. Thus, the metallic PCBs 75 and the cover bottom 20 cannot dissipate heat from the LEDs 70 rapidly. Further, because the path for radiating heat from the LEDs 70 is located only below the LEDs 70, heat from the LEDs 70 cannot be dissipated rapidly and sufficiently enough to avoid problems during the operation of the LEDs 70. As a result, the LEDs 70 in a typical LCD module are not thermally reliable.

The conventional backlight unit including the LEDs is structured such that most heat from the LEDs is dissipated rearward through the PCBs and the cover bottom.

The metallic PCBs are normally made from aluminum (Al), and the cover bottom is normally from an aluminum alloy or micro polyethylene ether-phthalein (MCPET), which each have relatively low thermal conductivities. Accordingly, when the backlight unit is used for an extended period of time, heat from the LEDs cannot be dissipated rapidly because of the relatively poor heat dissipating performance of aluminum (Al), aluminum alloy or micro polyethylene ether-phthalein (MCPET).

Most generated heat is concentrated on LED chips, however, because the reflection plate is disposed around the LED chips, a space for radiating heat is not sufficiently provided. Therefore, heat is not dissipated rapidly, and temperatures at the junction portions between the LEDs and the metallic PCBs increase, thereby deteriorating the operational reliability of the LEDs.

In LCD devices that include backlight units using other types of light sources than LEDs, when the LCD device is driven for a long time, temperatures within the LCD module are increased by heat generation, which may cause malfunction of the LCD panel. Accordingly, a structure to aid in the removal of heat from an operating LCD device and backlight unit is required.

BRIEF SUMMARY

Accordingly, the present invention is directed to a backlight unit and a liquid crystal display device using the same that substantially obviate one or more problems of the prior art due to limitations and disadvantages of the related art.

A first representative embodiment of the present disclosure provides a backlight unit that includes a cover bottom, a plurality of light sources mounted in the cover bottom, a graphite spreader that dissipates heat from the light sources, and first and second coating films that are attached to the upper and the lower surfaces of the graphite spreader, respectively, and extend outward from an edge of the graphite spreader such that the first and second coating films contact each other.

A second representative embodiment of the present disclosure provides a liquid crystal display device that includes a cover bottom, a plurality of printed circuit boards (PCBs) which are disposed in rows on the cover bottom in parallel with each other, and a plurality of light emitting diodes (LEDs) which are mounted to the PCBs with a gap therebetween. An optical sheet is disposed on the LEDs and a liquid crystal display panel is disposed on the optical sheet. A guide panel supports the optical sheet and the liquid crystal display panel, and a case top which surrounds an edge portion of the liquid crystal display panel and side surfaces of the guide panel and the cover bottom. A graphite spreader is interposed between the cover bottom and the PCBs and is formed with at least one hole. First and second coating films are attached to upper and lower surfaces of the graphite spreader, respectively, and extend outward from an edge of the graphite spreader to such an extent that the first and second coating films contact each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate some of the embodiments of the disclosure. In the drawings:

FIG. 4b is a sectional view taken along line I-I' in FIG. 4a.

DETAILED DESCRIPTION

Reference will now be made in detail to the preferred embodiments of the disclosure associated with a backlight unit and a liquid crystal display device using the same, examples of which are illustrated in the accompanying drawings. Wherever possible, the same reference numbers will be used throughout the drawings to refer to the same or like parts.

In a backlight unit which uses light sources such as LEDs that have a high heat release rate, a component made of material having a high thermal conductivity, e.g., a graphite spreader, may be provided below the light sources in order to increase heat dissipation from the backlight unit. In this case, when the graphite spreader is used for an extended period of time, graphite particles may fall apart from a contact portion of the graphite spreader with other components due to an inherent nature of the graphite. Because the graphite particles are electrically conductive, if the graphite particles enter a PCB or peripheral circuits, the graphite particles may cause some problems to the electrical circuitry, such as a short.

Further, when a hole 90 is formed at the graphite spreader for coupling the graphite spreader to neighboring structures, the graphite particles may fall from the exposed side surface of the graphite spreader in the hole 90. In order to solve this problem, coating films 80a and 80b are provided to shield the side surfaces of the graphite spreader in the hole 90.

Hereinafter, the backlight unit according to the present invention will be described in detail with reference to the annexed drawings.

Figure 1:
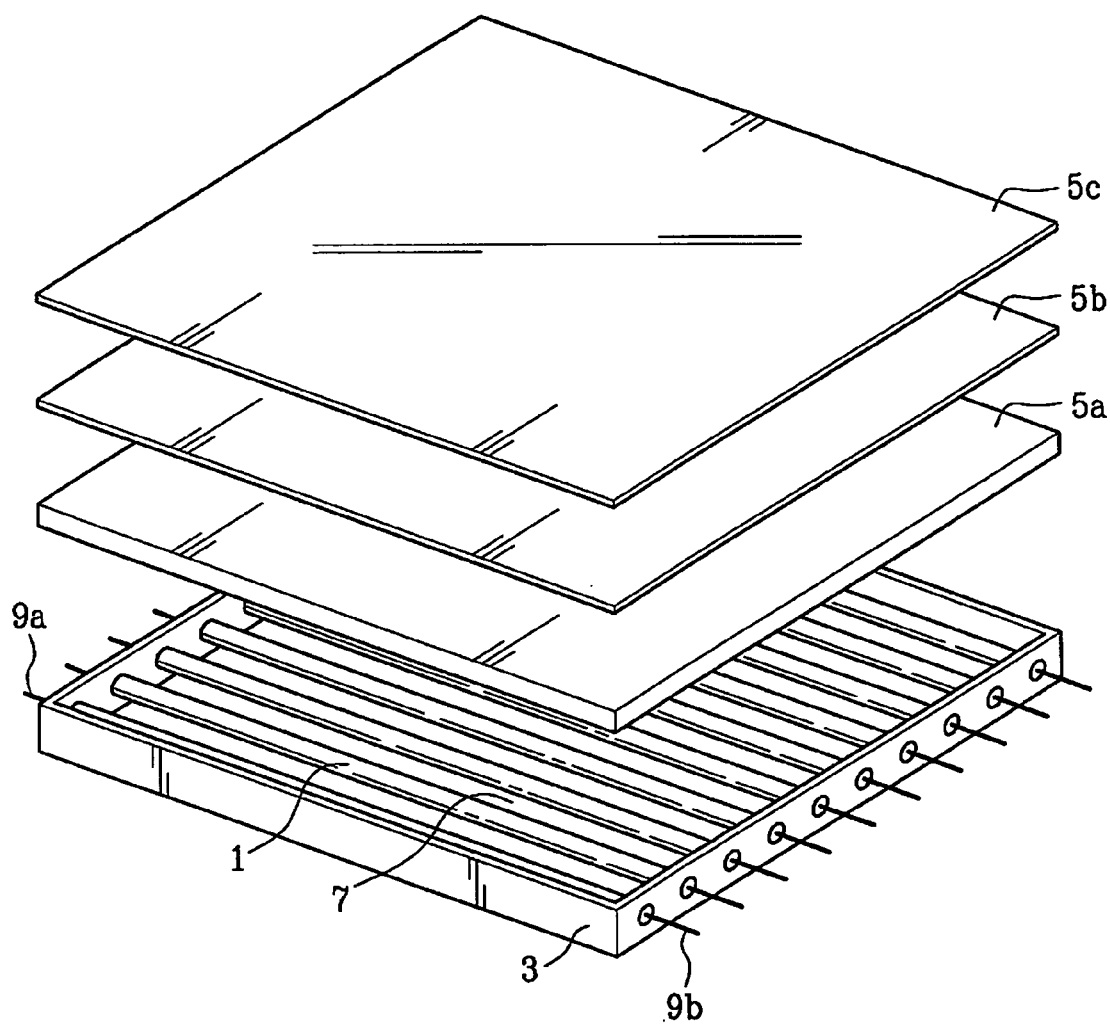
FIG. 1 is a perspective view showing a conventional backlight unit including fluorescent lamps.
Figure 2:
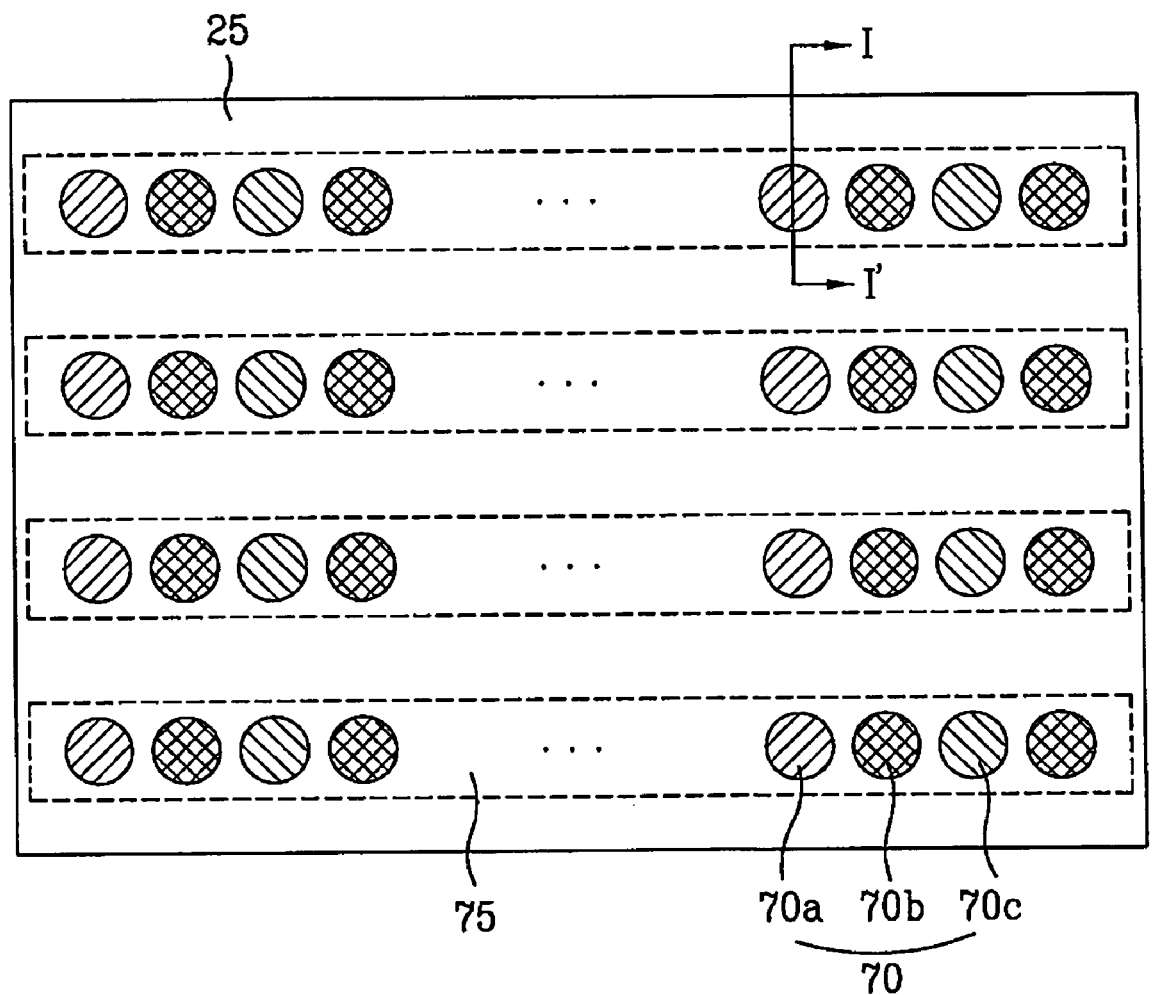
FIG. 2 is a plan view showing a conventional backlight unit including light emitting diodes.
Figure 3:
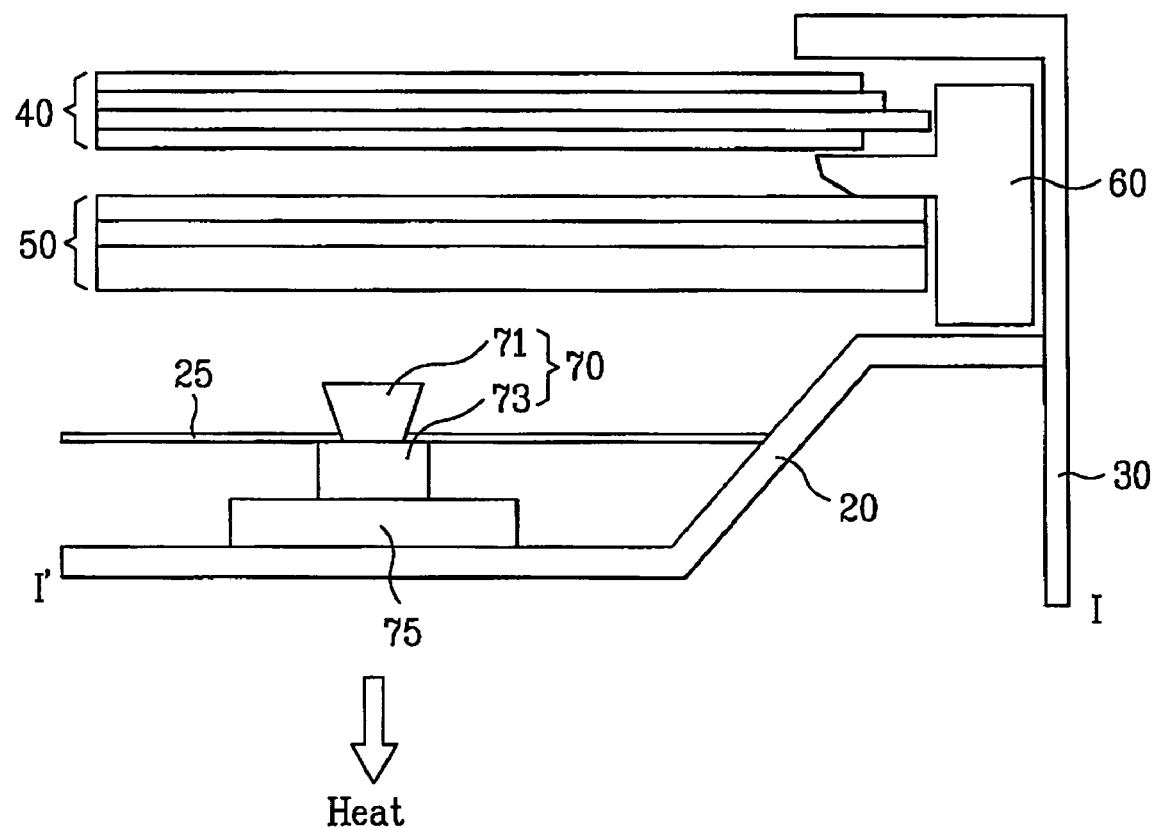
FIG. 3 is a sectional view showing a liquid crystal display device equipped with a backlight unit in FIG. 2.
Figure 4A:
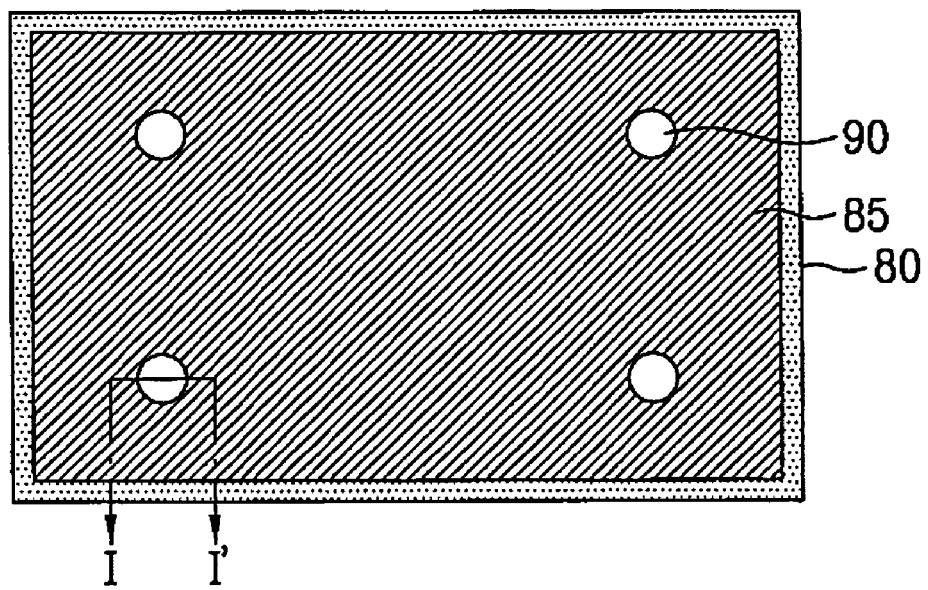
FIG. 4a is a sectional view showing a backlight unit including a graphite spreader.
Figure 4B:
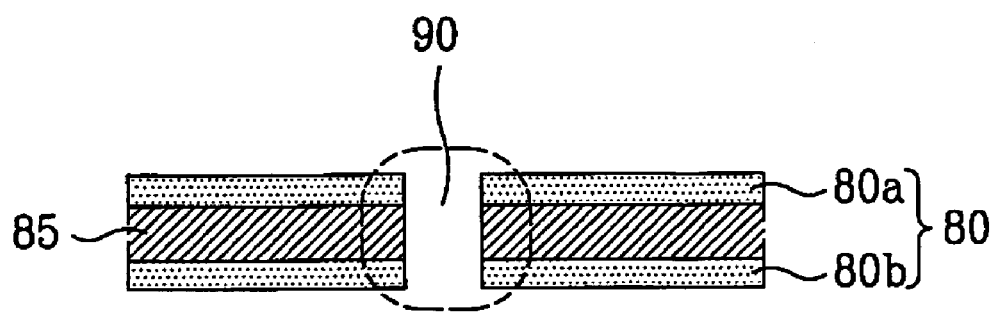
Figure 5:
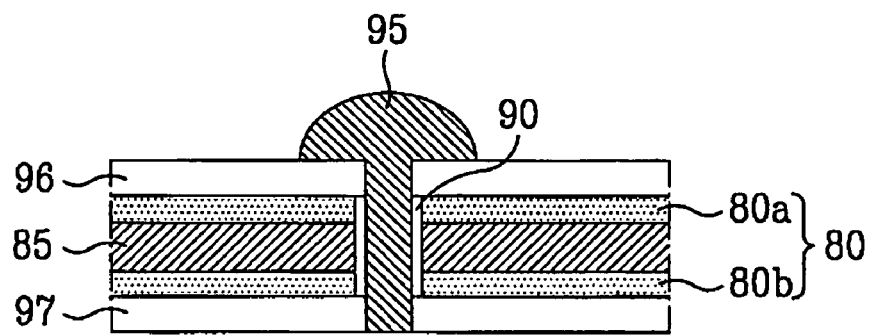
FIG. 5 is a sectional view showing a screw-coupling structure of a backlight unit in FIG. 4b.

As shown in FIGS. 4a-5, when LEDs (shown in FIGS. 2 and 3) are used as a light source for the backlight unit, a graphite spreader 85 may be interposed between a printed circuit board (PCB) 96 that receives the mounted LEDs and a cover bottom 97 that surrounds the bottom and side surfaces of the LEDs and the PCB 96, to increase the heat dissipation from a driving circuit such as a PCB 96.

The thermal conduction coefficient of the graphite spreader 85 may be within the range of 400 W/mK to 800 W/mK. As compared to the conventional structure having only the PCB and the cover bottom below the reflection plate, because a component with a higher thermal diffusion effect is provided in the vicinity of the heat generating LEDs, heat generated by the LEDs is dissipated rapidly, and reliability of the backlight unit can be increased.

Alternatively, the cover bottom 97 may be manufactured from MCPET (Micro Polyethylene Ether-phthalein), which has a thermal conduction coefficient of which is about 0.2 W/mK. The PCB 96 may be made of AlSET (alloy of aluminum (Al) and E60L), which has a thermal conduction coefficient of which is about 100 W/mK. In other words, the cover bottom 97 and the PCB 96 have a smaller thermal conductivity than the graphite spreader 85. Therefore, depositing the graphite spreader 85 in the vicinity of the LEDs allows for dissipation or removal of more heat than with other designs.

As described above, as compared to the conventional structure having only the PCB and the cover bottom as the LED heat dissipation path, the thermal conductivity of the backlight unit according to the present embodiment is increased by at least 4 times, to as much as 4000 times more than the LCD without the disclosed heat dissipation path, in a relatively short time.

The thermal conductivity of the graphite spreader and other materials is as follows.

TABLE 1

| Material | Thermal Conduction Coefficient (W/mK) |
|---|---|
| Graphite Spreader | 400~800 |
| MCPET | 0.2 |
| AlSET | $\leqq 100$ |

From the above Table 1, it can be confirmed that the graphite spreader has a higher heat dissipation effect than the other materials.

However, due to the inherent nature of the graphite, the graphite particles may fall apart from a contact portion of the graphite spreader 85. The upper and lower coating films 80a and 80b (commonly 80) are attached to upper and lower surfaces of the graphite spreader 85 to protect the graphite spreader 85. It is preferable to form the coating films 80a and 80b with the same size. Each of the coating films 80 may be manufactured from soft plastic film.

The upper and lower coating films 80a and 80b extend outward from the edge of the graphite spreader 85 to so that the upper and lower coating films 80a and 80b contact each other, which prevents exposure of the graphite spreader 85.

The graphite spreader 85 is disposed at an inner side of the cover bottom 97. However, when forming a screw hole 90 at the graphite spreader 85, for coupling the graphite spreader 85 to a fixing structure (not shown), the graphite particles may fall through or from a hole-forming portion of the graphite spreader 85. Accordingly, the graphite particles may enter the PCB 96 or other circuits, which may cause electrical shorting or other problems.

Figure 6:
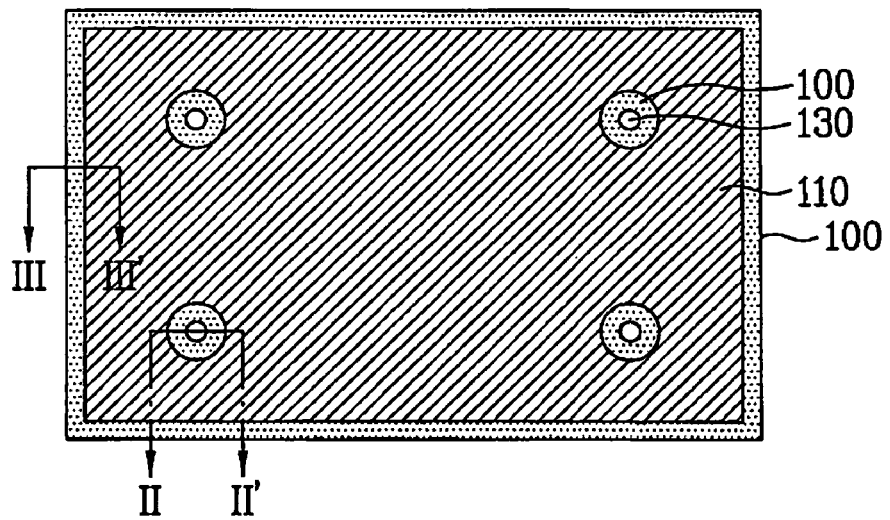
FIG. 6 is a plan view showing a graphite spreader and coating films of a backlight unit.
Figure 7A:
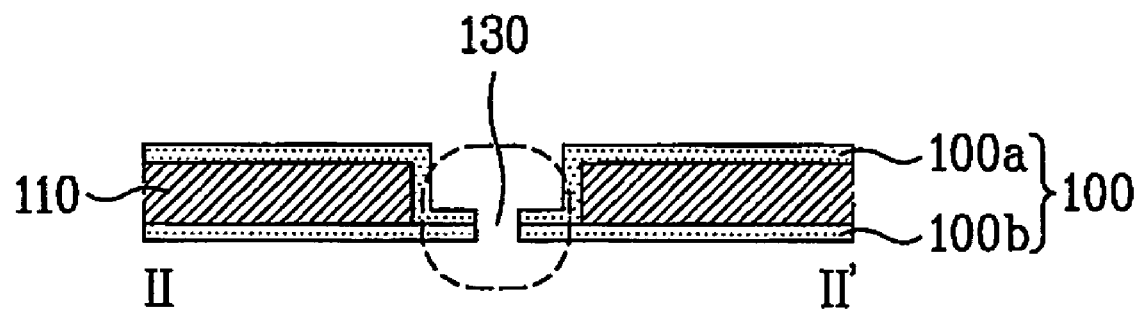
FIG. 7a is a sectional view taken along line II-II' in FIG. 6.
Figure 7B:
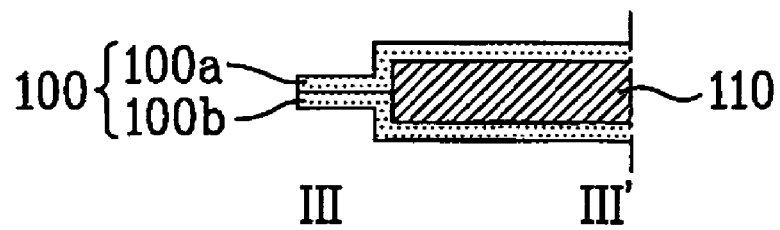
FIG. 7b is a sectional view taken along line III-III' in FIG. 6.
Figure 8:
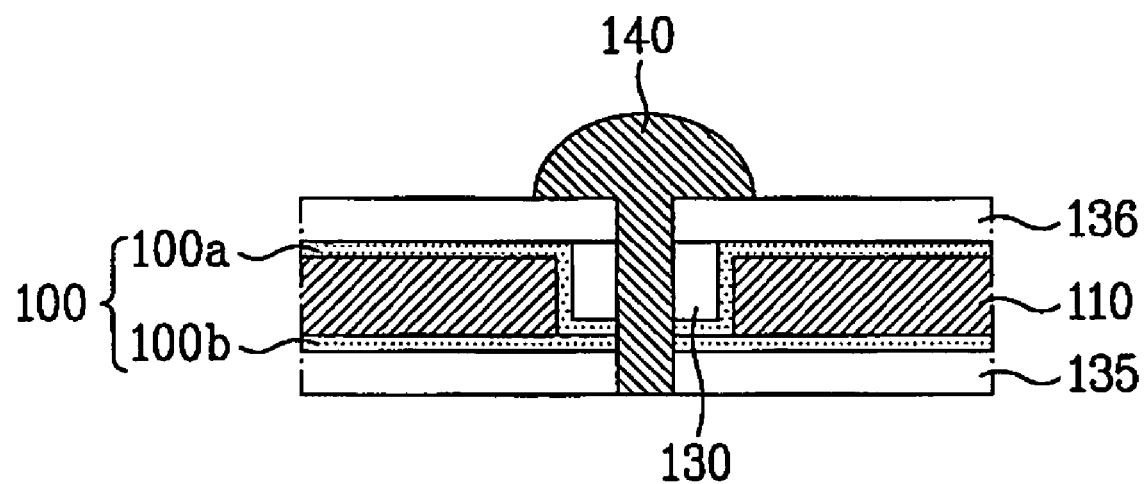
FIG. 8 is a sectional view showing a screw-coupling structure of a backlight unit in FIG. 6.

Turning now to FIGS. 6-8, the backlight unit includes a cover bottom 135, a plurality of parallel printed circuit boards (PCBs) 136 which are arranged in rows on the cover bottom 135, a plurality of light sources (not shown) that are arranged on the PCBs 136 with a gap therebetween, a graphite spreader 110 that dissipates heat from the light sources and is formed with at least one screw hole, and first and second coating films 100a and 100b which are attached to the upper and lower surfaces of the graphite spreader 100 and extend outward from the edge of the graphite spreader 100 such that the first and second coating films 100a and 100b contact each other. The graphite spreader 110 has a high thermal conductivity and radiates heat from the light sources through the cover bottom 135.

The graphite spreader 110 may be formed with at least one screw hole 130, through which a screw is inserted and tightened to couple the graphite spreader 110 to a fixing structure which is disposed thereabove. As shown in FIG. 6, four screw holes 130 may be provided. Alternatively, the number and arrangement of the screw holes 130 may be widely varied to allow for coupling to the fixing structures.

As shown in FIG. 7a, the size of the graphite spreader 110 corresponds to the cover bottom 135 and is disposed on an inner side of the cover bottom 135. The screw hole 130 is formed at a proper portion of the graphite spreader 110, through which the screw is tightened. The first and second coating films 100a and 100b are attached to the upper and lower surfaces of the graphite spreader 110, respectively. The first coating film 100a is attached to the upper surface of the graphite spreader 110 and hangs down along the side surface of the hole-formed portion of the graphite spreader 110, where it comes into contact with the second coating film 100b attached to the lower surface of the graphite spreader 110. The first and second coating films 100a and 100b are formed with a hole corresponding to the screw hole 130 of the graphite spreader 110, through which the screw can pass. The hole of the coating films 100 may be formed when attaching the first and second coating films 100a and 100b to the upper and lower surfaces of the graphite spreader 110, by intentionally removing the corresponding area from the coating films 100.

As shown in FIG. 7b, the first and second coating films 100a and 100b are attached to the upper and lower surfaces of the graphite spreader 110 that extend outward from the edge of the graphite spreader 110. The edge portion of the first coating film 100a hangs down along the outer side surface of the graphite spreader 110 and the edge portion of the second coating film 100b climbs up along the outer side surface of the graphite spreader 110, such that the edge portions of the first and second coating films 100a and 100b meet and are securely attached to each other.

The first and second coating films 100a and 100b attached to the upper and lower surfaces of the graphite spreader 110 inward of the screw hole 130, the aforesaid problems (e.g., falling of the graphite particles) generated at the hole-formed portion of the graphite spreader 110 are prevented.

As a result, the whole surface of the graphite spreader 110, including the edge and the hole-formed portion, is sealed by the first and second coating films 100a and 100b. In other words, because no portion of the graphite spreader 110 is exposed the graphite particles are prevented from falling from the graphite spreader 110 when tightening the screw 140 through the screw hole 130 to fix the PCB 136, the graphite spreader 110 and the cover bottom 135.

Because the graphite spreader 110 has the higher thermal conductivity than aluminum, the graphite spreader 110 can rapidly dissipate heat from the light sources mounted to the PCB 136. Also, the specific gravity of the graphite spreader 110 is much lower than that of the commonly-used metals, so the graphite spreader 110 does not have a significant effect on the weight of the backlight unit.

Figure 9:
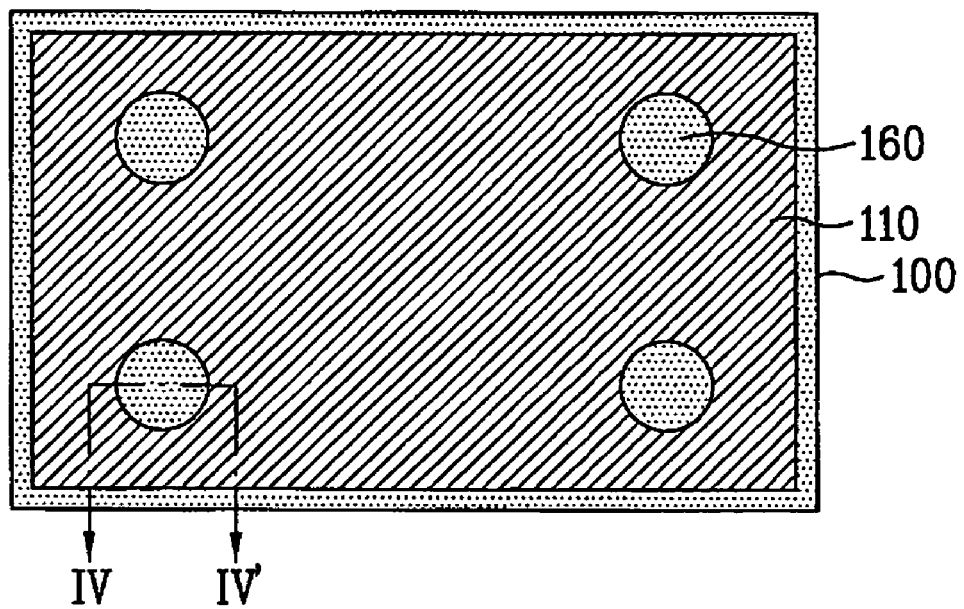
FIG. 9 is a plan view showing a graphite spreader and coating films of a backlight unit.
Figure 10:
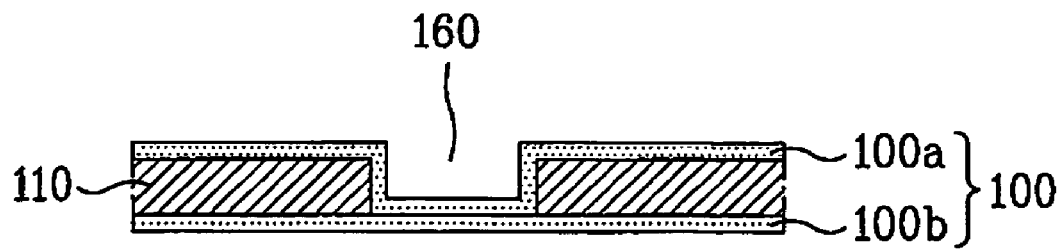
FIG. 10 is a sectional view showing a screw hole structure of the backlight unit in FIG. 9.

As shown in FIGS. 9 and 10, the first and second coating films 100a and 100b are attached to the upper and lower surfaces of the graphite spreader 110, respectively, except for an area where a screw hole 160 is provided. The whole surface of the graphite spreader 110 including the edge and the hole-formed portion is sealed by the first and second coating films 100a and 100b. The overall structure of the current embodiment is same as that of the previous embodiment, except that the screw hole 160 is blocked by the first and second coating films 100a and 100b. In such a structure, when tightening the screw (i.e. element 140 in FIG. 8) through the screw hole 160, the regions of the first and second coating films 100a and 100b located at the screw hole 160 are pierced by the screw. It is preferable to make the first and second coating films 100a and 100b thin to allow for easy piercing by the screw when tightened.

Figure 11:
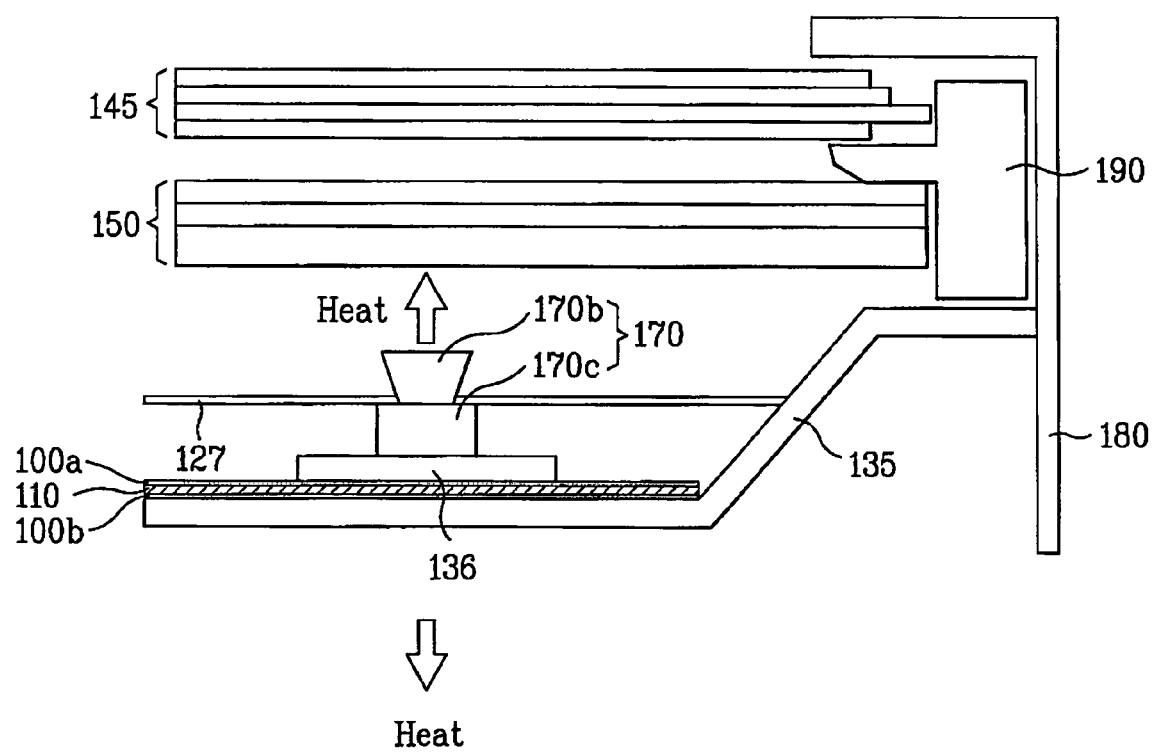
FIG. 11 is a sectional view showing a liquid crystal display device equipped with a backlight unit.
Figure 12:
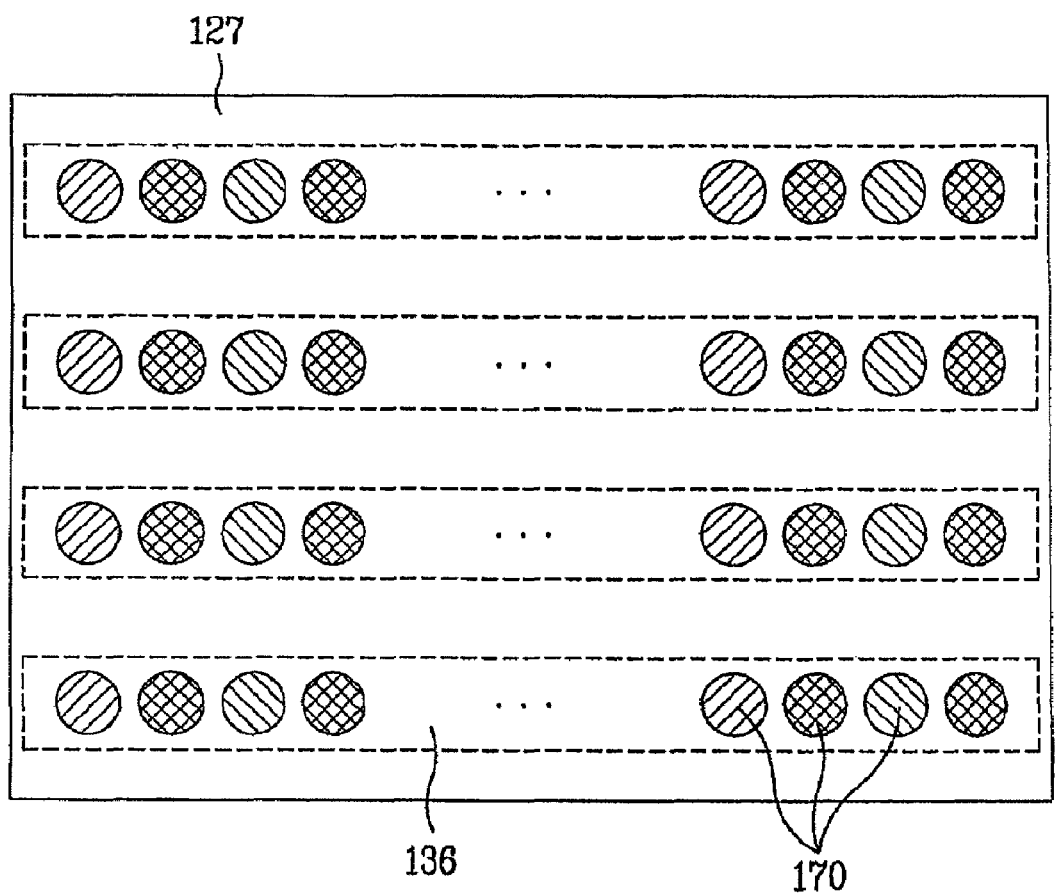
FIG. 12 is a plan view showing a plurality of light sources mounted on printed circuit boards.

As shown in FIG. 11, the LCD device includes a cover bottom 135, a plurality of parallel printed circuit boards (PCBs) 136 that are arranged in rows on the cover bottom 135, a plurality of red, green and blue LEDs 170 which are arranged on the PCBs 136 with a gap therebetween. A reflection plate 127 is formed around the red, green and blue LEDs 170 and a plurality of optical sheets 150 which are disposed above the LEDs 170. An LCD panel 145 is disposed above the optical sheets 150 and a guide panel 190 supports the LCD panel 145 and the optical sheets 150, a case top 180 which is formed near an upper edge portion of the LCD panel 145 and side surfaces of the guide panel 190 and the cover bottom 135. A graphite spreader 110 is provided between the PCBs 136 and the cover bottom 135. As shown in FIGS. 7a and 7b, coating films 100a and 100b are attached to the upper and lower surfaces of the graphite spreader 110.

A space is provided between the LCD panel 145 and the optical sheets 150, which receive a protruding pattern of the guide panel 190. The cover bottom 135 is disposed under the optical sheets 150 and spaced therefrom, which provides a space where the plurality of PCBs 136 are mounted and heat from the LEDs 170 can be dissipated. The PCBs 136 are spaced apart from each other with a regular gap therebetween, and dissipate heat from the LEDs 170.

The LCD panel 140 includes upper and lower substrates which are spaced apart from each other, a liquid crystal layer (not shown) which is interposed between the upper and lower substrates, and upper and lower polarizing plates that are formed at surfaces of the upper and lower substrates. The optical sheets 150 include first and second prism sheets and diffusers.

In the above-structured LCD device equipped with the backlight unit, an image may be displayed on the LCD panel 145 by selectively lighting the LEDs 170. If power is applied to all of the LEDs 170 or selectively applied to the red LEDs, the green LEDs, and the blue LEDs, the corresponding LEDs emit light. The red, green and blue light emitted from the LEDs 170 are mixed by the space between the LEDs 170 and the optical sheets 150 and by the optical sheets 150, and the mixed light is irradiated to a rear surface of the LCD panel 145.

Each of the LEDs 170 includes a light-emitting part and a supporting part. The light-emitting part includes an LED chip (not shown) and a lens 170b covering the LED chip. The supporting part includes a body 170c supporting the LED chip and the lens 170b, and lead terminals (not shown) provided at both sides of the body 170c.

The LEDs 170 are mounted to the PCBs 136 by soldering the lead terminals to the PCBs 136. A low thermal conductivity insulation film of may be interposed between the body 170c and the PCBs 136.

If fluorescent lamps are used as the light source instead of the LEDs, the PCBs 136 in FIG. 8 may be substituted by a reflection plate or other structure positioned between the light source and the cover bottom.

When the graphite spreader is provided to effectively radiate heat from the light source, the coating film structure sealing the entire surface of the graphite spreader, including the edge and the portion where the screw hole is formed, can also be applied to other types of backlight units that are equipped with the various light sources including LEDs and fluorescent lamps.

As described above, the graphite spreader is provided to increase the heat dissipation from the light sources. The coating films may be adhered either partially or fully on the upper and lower surfaces of the graphite spreader. When the graphite spreader is formed with the screw hole, the whole surface of the graphite spreader includes the edge and the hole-formed portion and is sealed by the coating films. Accordingly, the graphite particles are prevented from falling from the graphite spreader, and the problematic results from falling graphite particles can be minimized, which increases the operational stability of the driving circuits of the backlight unit.

As apparent from the above description, the backlight unit and the LCD device using the same can minimize the temperature rise within the LCD device and increase operational reliability of the device by providing the high thermal conductivity graphite spreader to more effectively dissipate heat from the light sources.

Also, by sealing the whole surface of the graphite spreader, including the edge and the portion where the screw hole formed with coating films, the negative influence from foreign substances (e.g., the graphite particles) generated from the graphite spreader may be prevented, and the operational reliability of the device is increased.

Also, as compared to conventional expensive thermal conductive pads that prevent image quality deterioration and decrease of the operational reliability, because the graphite spreader is relatively inexpensive, increasing manufacturing productivity of the device.

Also, due to the simple structural modification of the coating films that extend outward from the edge of the graphite spreader and inward of the screw hole, the heat dissipation effect can be further enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
   a cover bottom;
   a plurality of light sources mounted on the cover bottom;
   a graphite spreader that dissipates heat from the light sources; and
   first and second coating films that are attached to upper and lower surfaces of the graphite spreader, respectively, and extend outward from an edge of the graphite spreader to such an extent that the first and second coating films contact each other.

2. The backlight unit according to claim 1, wherein the first and second coating films extend inward of a hole formed on the graphite spreader so that the first and second coating films contact each other.

3. The backlight unit according to claim 2, further comprising:
   a plurality of printed circuit boards (PCBs) that receive the light sources, the PCBs being disposed in rows on the cover bottom in parallel with each other.

4. The backlight unit according to claim 3, wherein the PCB is formed with a hole corresponding to the hole of the graphite spreader.

5. The backlight unit according to claim 3, wherein the light source is a light emitting diode.

6. The backlight unit according to claim 2, wherein the cover bottom is formed with a hole corresponding to the hole of the graphite spreader.

7. The backlight unit according to claim 6, wherein a screw is tightened through the hole of the graphite spreader and the hole of the cover bottom.

8. The backlight unit according to claim 2, wherein the first and second coating films extend inward of the hole of the graphite spreader block the hole.

9. The backlight unit according to claim 2, wherein the first and second coating films extending inward from the hole of the graphite spreader contact each other.

10. A liquid crystal display device comprising:
    a cover bottom;
    a plurality of printed circuit boards (PCBs) disposed in rows on the cover bottom in parallel with each other;
    a plurality of light emitting diodes (LEDs) mounted to the PCBs with a gap therebetween;
    an optical sheet disposed on the LEDs;
    a liquid crystal display panel disposed on the optical sheet;
    a guide panel supporting the optical sheet and the liquid crystal display panel;
    a case top at least partially surrounding an edge portion of the liquid crystal display panel, side surfaces of the guide panel, and the cover bottom;
    a graphite spreader interposed between the cover bottom and the PCBs and formed with at least one hole; and
    first and second coating films attached to upper and lower surfaces of the graphite spreader, respectively, and extending outward from an edge of the graphite spreader to such an extent that the first and second coating films contact each other.

* * * * *